United States Patent [19]

Weeper

[11] 4,289,466
[45] Sep. 15, 1981

[54] APPARATUS FOR THE CONTINUOUS MANUFACTURE OF HOLLOW TUBULAR ELEMENTS

[76] Inventor: Otto W. Weeper, Calle Bolivar No. 30, Turmero, Edo, Aragua, Venezuela

[21] Appl. No.: 146,180

[22] Filed: May 2, 1980

[51] Int. Cl.³ .............................................. B29C 3/02
[52] U.S. Cl. .................................. 425/112; 425/115; 425/363
[58] Field of Search ........................ 425/112, 115, 363

[56] References Cited

U.S. PATENT DOCUMENTS

3,809,514  5/1974  Nunez .................................. 425/112

Primary Examiner—J. Howard Flint, Jr.
Attorney, Agent, or Firm—Michael J. Striker

[57] ABSTRACT

An apparatus for continuously manufacturing hollow tubular elements has an elongated central core with one end portion connectable with a drive for rotation about its longitudinal axis, a plurality of supporting elements projecting circumferentially outwardly from the central core and longitudinally spaced along the same, a plurality of guides means each provided on the supporting element and axially aligned with one another, a cam element forming a cam surface arranged circumferentially about the longitudinal axis of the core and extending in a plane which is helical with respect to the plane transverse to the axis, and a plurality of rod elements forming a substantially cylindrical molding surface, arranged in side-by-side relationship, and extending longitudinally over the entire length of the central core in a circumferentially spaced relationship with the latter. The rod elements are aligned on the supporting elements and guided in an individual cyclic displacement by the guides and each arranged immediately following the cam element and urged against the cam surface of the latter. The cam element with the cam surface is supported in a non-revolving manner on the central core so as to remain immovable during the rotation of the central core.

17 Claims, 11 Drawing Figures

APPARATUS FOR THE CONTINUOUS MANUFACTURE OF HOLLOW TUBULAR ELEMENTS

BACKGROUND OF THE INVENTION

The present invention relates to the manufacture of hollow tubular elements. More particularly it relates to a novel apparatus adapted for manufacturing hollow tubular elements of the type formed from a spiral-wound strip.

The manufacture of hollow tubular elements from a strip of materials from a great variety of sources, spirally wound continuously until reaching a particular length, has long been known. The process for the manufacture of this type of tubular elements, however, had always been of the intermittent or non-continuous type, that is, a process wherein the manufacture of a length of tubular element of predetermined length was performed on an apparatus suitable for the purpose. After the stages of the manufacturing process were completed, the tubular element thus formed had to be withdrawn from the apparatus, and the said apparatus had to be prepared for the production of another length of similar characteristics, totally independent of the first, and so on.

U.S. Pat. No. 3,809,514, granted to Julio de Castro Núñez, entitled, "MACHINE FOR THE CONTINUOUS MANUFACTURE OF HOLLOW ELEMENTS," describes and claims an apparatus for manufacturing said tubular elements continuously. In the method of using the said apparatus, the spiral winding of the continuous strip forming the hollow element is performed continuously in the apparatus, automatically, as the spirals of the tubular element are made to advance towards the output end of the apparatus, where the formed tubular element is continuously delivered in a self-supporting condition, in a single strand of indefinite and continuous length. That is to say, by means of the apparatus of the said De Castro patent, a hollow tubular element can be obtained of appropriate size and of indefinite length.

The inventive principle of the patent mentioned above is based essentially on the use of an apparatus of elongated, generally cylindrical configuration, formed by a plurality of elongated, mold-forming elements on which there is disposed a continuous band supported on the said devices, and helically wound such that the spirals of the winding do not overlap one another nor separate substantially, but extend side by side. At the output end of the apparatus, the said continuous band is returned towards the starting or input end along an axial path through the center of the winding. The entire assembly thus disposed receives a rotational movement on the axial shaft of the cylinder, such that the said movement will continuously produce the advancement of the spirals towards the output end, from which the continuous band is continuously returned, as stated above. The elongated, mold-forming elements do not follow a straight path along the axial plane of the assembly, but are oriented with a slight tilt so as to favor the movement of the continuous band in the manner mentioned above.

Although this apparatus works, and is capable of producing the effects that it is said to produce (that is, a continuous tubular element from a continuous strip of material wound spirally with a partial overlap), it has a number of disadvantages and difficulties with the result that its employment has not been as widespread as an improvement of such nature over the prior art might have been expected to have.

Indeed, among the chief difficulties from which this apparatus suffers is the fact that the continuous band must be made of a highly flexible material so as to permit the abrupt bend at the output end for its return to the input end. This implies that the band must have a small thickness so as to be able to adapt perfectly to the circumference of the mold, and can accomplish the return perfectly. But, since the continuous strip from which the tubular element is to be formed, upon being wound upon the said continuous band, places tensile stress on the band along the entire length of the wound surface, the loss of the arrangement of the turns one beside the other is frequent, and therefore one or more of the said spirals pile up or overlap, resulting in the intensifying of the tensile stresses on the spiral that remains underneath, and this occasionally results in the breaking or bursting of the said continuous band at that point. Needless to say, when this event occurs, and it is quite frequent, it is necessary to stop the process, remove a substantial portion of the formed but unfinished tubular element, with a loss of time and materials and repair costs.

Other times the phenomenon mentioned above produces the result that the contiguous spirals of the continuous band separate too much from one another, thus permitting the fluid or semi-fluid material being used to pass from the molding surface defined by the spirals to the inside thereof, that is, on the mold-forming elements. Since these elements must be animated with movement, there is a plurality of wheels on which they are seated, which, when they remain in reach of the fluid or semi-fluid material, ordinarily a resin, will fail to operate properly, or will not operate at all, depending on the degree of resin clogging, and on the physical characteristics of the resin. When this is the case, it will also be necessary to halt the process, remove the continuous band, take apart the roller assembly and wheels and clean them individually so as to eliminate the resin, with the concomitant loss of time, labor, materials, etc.

Another very important disadvantage in the apparatus in question is the fact that the roller elements or the like, mentioned above, are not disposed continuously over the entire length of the apparatus, but are distributed more or less equidistantly therein, with intermediate portions of substantial length. Since the winding tensions of the continuous band are high, as stated previously, and since these tensions are increased by those produced by the continuous strip of material from which the continuous tubular element is formed, it is obvious that, in those intermediate portions lacking direct support from the wheels or the like, said tensions will produce flexing in the mold forming elements, whereby the cross section of the said mold will be altered, thus producing a tubular element of irregular section which is commercially unacceptable. In addition, this alteration of the level of the mold forming elements is also liable to produce overlapping of the continuous band, resulting in occasional breakage, as well as the formation of gaps between spirals in the contrary case, so that the fluid materials indicated before will enter in.

Another important disadvantage of the above-mentioned apparatus is based on the fact that the helical arrangement of the continuous band defines between two contiguous spirals, tending to produce a rib or helical protuberance on the inside of the formed tubular element, which will constitute a defect from the product quality viewpoint, since this rib will tend to produce turbulence in the liquid that is being carried inside of the tubular element when in use.

As a corollary of all the disadvantages cited above, it is to be stated that, due to the oblique or diagonal arrangement of the roller elements or the like, their correct arrangement is a tedious and slow job, inasmuch as a slight difference in the arrangement of one of these elements can create localized stresses which also will tend to overlap the spirals or the continuous band or break the latter. Therefore, every time that one of the circumstances mentioned above makes it necessary to disassemble the roller and wheel elements, a carefully controlled reinstallation of them must be performed, which makes the job of resumption of activities a very serious problem.

As it will be understood from what is set forth above, the frequent interruption of the operation of the apparatus of U.S. Pat. No. 3,809,514 very greatly reduces its output in terms of units of length of the tubular element in the time of operation of the apparatus, the quality of the element obtained does not satisfy the requirements of the market in many ways, and the workers needed for tending the apparatus must be highly skilled, all of which results in low profitability of the apparatus. Therefore, an apparatus for the continuous manufacture of hollow tubular elements is needed which will not have the disadvantages of the apparatus of the above-cited U.S. patent.

SUMMARY OF THE INVENTION

The present invention has as its general purpose to offer the said apparatus by means of which continuous indefinite lengths of hollow tubular elements formed from continuous, spirally wound strips can be obtained, the apparatus being of extremely simple construction, with virtually no parts that can be broken by tensions during operation, and capable of working for an indefinite time without need of forced shut-downs for repairs.

It is particular object of the present invention to provide the apparatus in question, wherein the mold-forming devices also constitute the devices which produce the advancing movement of the overlapped spiral strip from which the tubular element is formed.

It is another objective of the invention to provide, in the said apparatus, a combination of controlled cyclic longitudinal advancing movement, in said mold-forming devices and advancement producers, so that the product may be formed and may be delivered continuously at the output end.

Another objective of the invention is to furnish an apparatus for the continuous manufacture of hollow tubular elements, provided with devices converting the rotational movement to the cyclic longitudinal displacement of the mold forming and feed producing devices, so as to obtain the combination of both movements and the resultant spiral winding.

It is also an objective of the invention to provide the said apparatus wherein the molding surfaces with helical or transverse slotting have been eliminated in order thus to assure a substantially smooth and commercially acceptable surface on the product obtained.

It is contemplated as an objective of the invention to provide a corresponding plurality of mold forming and advancement producing device returning elements, in order that each one of them, individually, upon reaching the point of maximum controlled longitudinal feed, will be returned automatically to the zero longitudinal displacement position, in order to repeat the feed cycle.

It is likewise another objective of the invention to provide an apparatus of the kind mentioned having great versatility, in which a variety of materials can be used for the formation of the tubular elements, and in which products of widely varying diameters can be obtained.

The above and other additional objectives and advantages of the present invention will be better understood from the following explanation. The apparatus of the invention consists generally in a tubular core revolving on its own axial and with respect to a fixed cam device having a cam surface capable of producing at least two portions, maximum and minimum, of lift; a plurality of generally annular supporting elements are disposed along the tubular core, with equidistant spacing from one another; each supporting element defining a plurality of radially disposed slide surfaces, and at least one of the plurality of supporting elements is provided with guide means adapted for cooperating with the plurality of slide surfaces; and a corresponding plurality of elongated mold forming elements extending longitudinally and parallelly to the shaft of the tubular core in a lateral edge abutting relationship with one another; each mold forming element is disposed with a radially exterior surface defining the molding surface, and with a cam follower portion disposed for cooperating functionally with the fixed cam device such as to be able to slide along the cam surface between the maximum and minimum axial displacement positions; The mold forming devices extending in functional relationship with the slide surfaces of the supporting elements and with the guide means, such that, when a drive means rotates the tubular core, and with it the support means, the mold forming devices extending longitudinally also rotate on the slide surfaces and the guide means. As a result of this rotation, the mold forming elements, forcibly biased with their cam follower portion against the cam surface of the fixed cam device, are being displaced individually and successively from a minimum position to the maximum position of longitudinal displacement.

As it will be understood, this combination of longitudinal displacement and rotation of the mold forming members about their axial axis has the purpose of forming a continuous helical winding. This winding, which is performed on a continuous strip from which the continuous tube will be formed, will be directly related to the speed of axial advancement of the winding, so that there may be a predetermined overlap between the spirals. This overlap, of course, will be dictated by the amount of longitudinal displacement of the mold forming members, which, at the same time, will permit the feeding of the just-formed tube towards the delivery end.

It is considered in the present invention that the said mold forming devices, upon following the cam surface disposed circularly about the tubular core, will be pushed by said surface in a longitudinal sliding movement as they advance in the rotatory movement about the longitudinal axis of the tubular core, up to a point on the periphery at which they will be returned abruptly to the unslid position by the combined effect of the shape of the cam and of the spring bias which tends to bring them individually into the said position. Then the cycle will be repeated, so that the advance of the just-formed tubular element will be uniform and constant as long as the feeding of the continuous strip of material continues.

To permit a perfect comprehension of the conformation of the parts of the apparatus, their individual operation, their interaction and their placement in the apparatus, as well as the operation of the latter for the continuous production of tubular elements, a detailed description will be given herewith of some presently preferred embodiments of same, referring to the appended drawings in which they are represented, and in which:

FIG. 8 represents a partial cross-sectional view taken along the line VIII—VIII of FIG. 7, that is, as seen towards the input end.

DESCRIPTION OF PREFERRED EMBODIMENTS

Referring more in detail to the drawings, in which the same or similar parts are designated by the same numbers in the different figures, there is shown therein an apparatus for the continuous manufacture of hollow tubular elements, in its diverse variants embodying the aspects of the present invention. The apparatus is adapted to be installed and anchored in association with a drive means (not shown) which will impart a continuous rotation movement to the entire assembly, with the exception of the cam device which remains immobile, as will be described later on. The general conformation of the apparatus of the invention is generally cylindrical, horizontally elongated, and arbitrarily it will be considered, in the present description, to be provided with an input end and an output end. The input end is disposed with a plurality of devices suitable for permitting the operation of the various elements of same, as well as with feed means (not shown) functionally related with the apparatus of the invention. These feed means are disposed so as to deliver, at the input end of the apparatus of the invention, immediately following the plurality of devices, the elements or materials which will be used for forming the hollow tubular element, which, for convenience, shall be referred to hereinafter as "helical tubing." Said materials can be a material in continuous strip form, e.g., paper, soft cardboard, cellophane, or any suitable plastic material, preferably of fibrous constitution, which can be delivered from a suitable coil; and a gluing material of any type appropriate for use in the invention, capable of being hardened and brought to a condition sustaining the shape of the helical tube formed.

A central hub or core 10 extends the entire length of the apparatus, projecting through the input end at portion 10a. Depending on the diameter of the helical tube that is going to be formed, this central core can be a hollow tubular element, like the one represented in FIGS. 1, 2, 7 and 8, or else a solid cylindrical element like the one represented in FIGS. 3 and 4. Of course, the end 10c can be received in an appropriate bearing (not shown), and will be coupled to the output shaft of the drive means (not shown), either directly or by means of any suitable transmission means for driving said core 10 with a movement of rotation on its longitudinal axis.

A plurality of annular sleeves 10a, 10b, are fixedly connected to the core 10, at predetermined, longitudinally spaced positions on the entire length of the principal portion of its extension. These sleeves, in addition to their functional purpose described further below, have the purpose of permitting the use of standard cylindrical elements as the core 10, eliminating the need for mechanizing them to provide for the diameter enlargements needed at the locations which they occupy on the core 10.

Upstream of the first sleeve 10a, that is, situated towards the end 10c of the core 10, there is disposed a cam means 11, received in a non-fixed relationship on the core 10, such that the core 10 can revolve about its longitudinal axis without carrying with it the cam 11. The position of the cam 11, which has been inserted over the core 10 at one of its ends, is fixed by the provision of bushings constituting restraints against its axial displacement. A front bushing is situated at the downstream end of the cam 11, in abutting couplement with a cooperating portion 11a thereof, and it is fixed in position by means of set screws 13 which pass through radial bores provided in the bushing 12 until it bears forcibly against the outer surface of the core 10. Although this arrangement can be considered sufficient to obtain the desired immobilization, it is possible to provide a circumferential groove within which the end of the set screws 13 can be received, in order thus to increase their fixing function.

At its upstream end, the cam is fixed in its position by means of a second cylindrical bushing 14, disposed in an abutting position against the rearward edge 11b of the cam 11. This bushing 14 is locked in position by means of set screws 15 which pass through radial bores formed in the said bushing 14, and whose ends are disposed for bearing against the radially exterior surface of the core 10. Although this arrangement, again, can be considered sufficient to obtain the desired immobilization against longitudinal displacement of cam 11 toward the end 10c, it is contemplated that, selectively, a circumferential groove (not illustrated) can be used, within which the end of the set screws 15 can be accommodated.

Figures 5, 6:
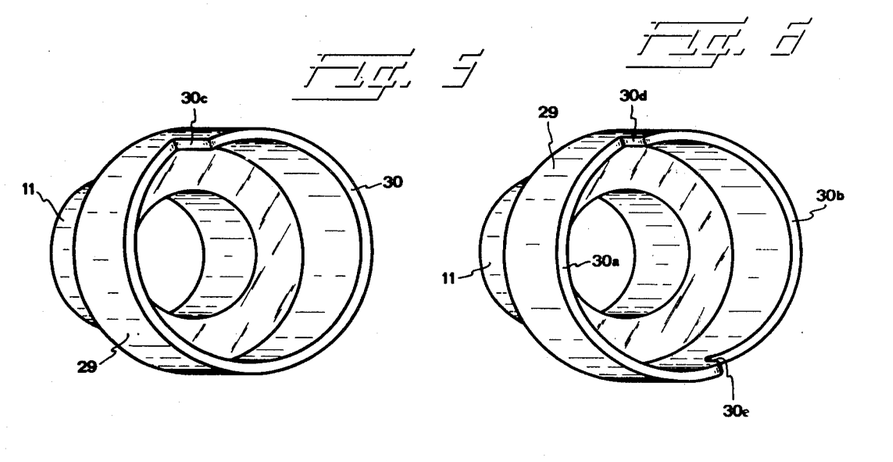
FIGS. 5 and 6 are conventional perspective views of two different embodiments of the cam device used in the apparatus of the present invention to obtain two different advancing templates.
Figure 6:
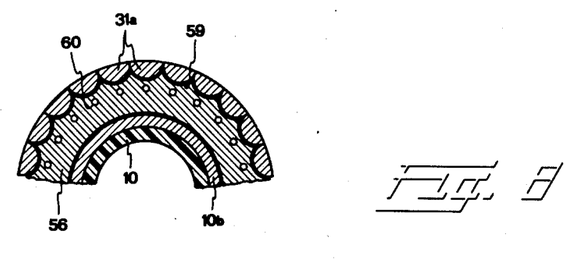

The cam 11 is constituted by a tubular body, generally in the form of a cylindrical sleeve, whose inside diameter is slightly greater than the outside diameter of the core 10, such that there can remain sufficient clearance between said elements so that the rotation of the core 10 will not cause the rotation of the cam 11. At its downstream end, cam 11 has a substantial widening of its diameter to define the flared portion 29 which begins at the intermediate step defined by the abutting surface 11a. The outer edge of said flared portion 29 defines a cam surface 30 which extends annularly about the core 11 at a distance from its outer surface, concentric therewith. As seen in FIGS. 5 and 6, basically two different embodiments are contemplated in the present invention for the said cam surface 30: one having an end edge 30 defining a cam surface spirally disposed with respect to a plane transverse to its axial axis where the point of maximum approach and the point of maximum removal from such plane coincide in the same circumferential plane, thus defining the step 30c which extends axially to unite said two points. The length of the step 30c shall be selected on the basis of criteria to be discussed amply further below.

The second embodiment of the cam surface 30, illustrated in FIG. 6, has an end edge defining two cam surfaces disposed spirally with respect to a plane crossing its longitudinal axial axis. Each cam surface 30a, 30b, extends substantially 180° of the circumference of the flared portion 29, having, therefore, two points of maximum approach to the said plane, coinciding with two other points of maximum departure. Both points, diametrically separate, are united by steps 30d, 30e, respectively. The length of these steps 30d, 30e, will also be selected in accordance with criteria to be discussed further on. However, it can be stated that, regardless of the criterion selected for the embodiment illustrated in FIG. 5, the embodiment in FIG. 6 must be selected with an equal criterion, divided by two, since the total length of step 30c, for a given criterion, will always correspond to the sum of the lengths of the steps 30d, 30e, in the embodiment in FIG. 6. It should also be pointed out that more than two cam surfaces, equivalent to surfaces 30a, 30b, could be selected, provided that the same proportion is maintained in the steps.

Figure 2:
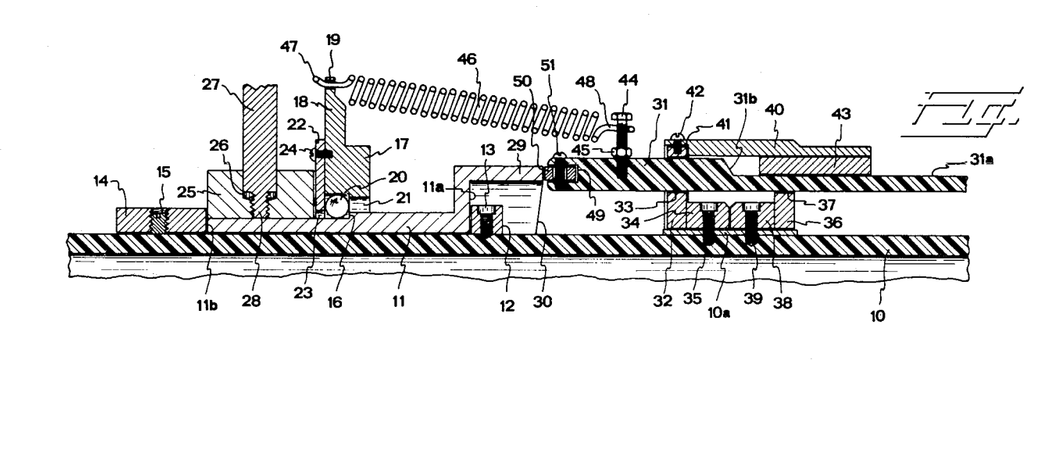
FIG. 2 is a view corresponding to FIG. 1, showing a cross section taken in the axial longitudinal plane of the same input end portion.
Figure 3:
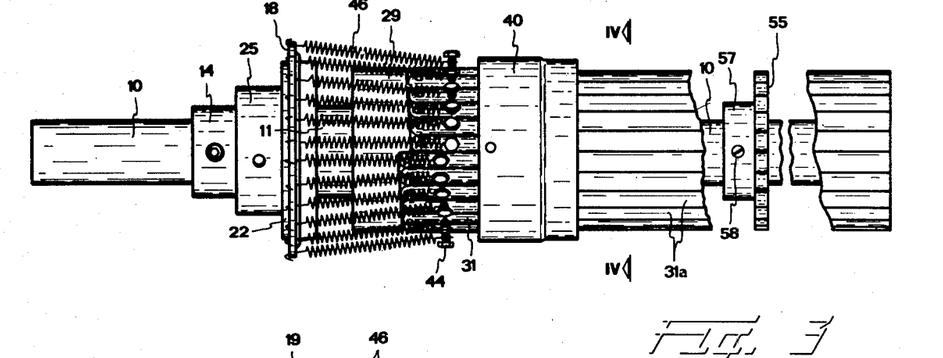
FIG. 3 is an elevational view of the same portion shown in FIG. 1, partially cut away to show a variant of the core, and showing the arrangement of the supporting elements for the mold-forming and displacement producing rods.

The cylindrical cam body 11 has a widening in its outside diameter towards the front half (that is, towards the downstream end), there, too, defining a small step. Immediately above the step there is disposed a crown element 17, concentrically borne on the cam body, in a rotational relationship therewith, so that when the cam remains immobile, the crown 17 can rotate. A portion 18 of the said crown defines a surface extending circumferentially outward in the form of a plate on which there has been provided a plurality of orifices 19 near to its outside circular edge. This crown 17 and the step of cam 11 form between them a receptacle 16 adapted to receive a bearing 20, which can be inserted in position from the upstream side. A back plate 22 serves to cover almost entirely the receptacle 16, leaving only a bottom passage 23 suitable for lubrication. Another larger passage, indicated at 21, limits the receptacle 16 at the front face. This passage serves to leave a space between the crown and the cam body to accommodate any inclination of the crown due to the tension of the springs anchored to it. Preferably, the bearing 20 will be of the axial thrust type, for resisting the stresses which will be placed on the said crown, as will be discussed further on. The said step of cam 11, together with the bearing 20, will limit axial displacement of crown 17 in the downstream direction. Its upstream displacement will be limited by a cylindrical bushing 25 provided with at least one circular orifice 26 whose bottom is threaded. In the said orifice there is received the threaded end 28 of a fastener 27 which can be introduced until it presses on the upstream end of the cam 11 so that, by means of the said fastener 27, the cam can be immobilized by means of a suitable latch means against any rotation that might be caused by the light friction against the outer circumferential face of the core 10. This bushing 25, therefore, remains concentric with the core 10 and mounted on the upstream portion of the body of cam 11, between the plate 22, which is fixed in position against the crown 17 by the set screws 24, and the bushing 14. This arrangement is best seen in FIG. 2.

Figure 4:
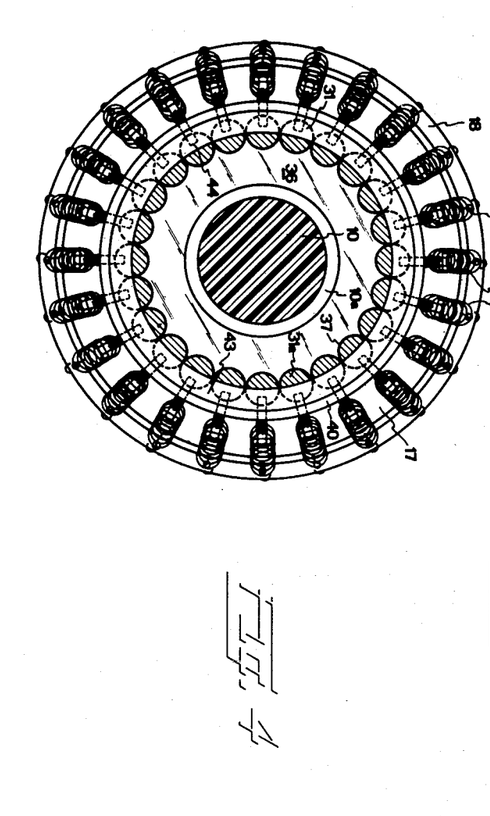
FIG. 4 shows a cross sectional view taken along line IV—IV of FIG. 3, that is to say, looking towards the input end.

At a certain distance downstream from the cam 11 there is disposed the first collar 10a which, as stated before, is affixed to the core 10. The purpose of this collar is to serve as a base for holding a support means for the molding surface forming elements, generally indicated by the number 31. The support means is constituted by a circular transverse plate 32 provided with a plurality of passages 33 arranged in a circumferential pattern, which is best seen in FIG. 4. The said plate has a configuration in profile which is generally L-shaped, in which the foot of the L defines a connecting portion. This connecting portion 34 is connected to the sleeve and to the core 10a, , 10, respectively, by means of a series of set screws 35, so that the plate extends in a plane transverse to the longitudinal axis of the core 10, and so that the passages 33 extend parallel to the said axis. A support portion 36, which has a circular outer edge provided with channels 37 extending in the same longitudinal plane as the passages 33, is a short distance away from the plate 32, extending parallel thereto. Its configuration is also that of an inverted L, the foot of the L constituting the connecting portion 38. By means of this portion, which extends to abut with the connecting portion 34, the support portion 36 is affixed to the sleeve 10a and to the core 10 by means of the set screws 39. A comlementary upper element 40 extends concentric to the core 10, being secured to the plate 32 at its outer edge by means of the connecting end portion 41 where it is fastened by means of screws 42. Thus, the complementary element 40 extends like a bushing towards the downstream end, bearing internally a lower gripping portion 43, which is disposed to leave between it and the channels 37 a space sufficient for the sliding of an adequate portion 31a of the mold forming elements 31, mentioned above; serving to prevent the said elements 31 from opening radially outward from its portion inserted through the circular passages 33.

Figure 7:
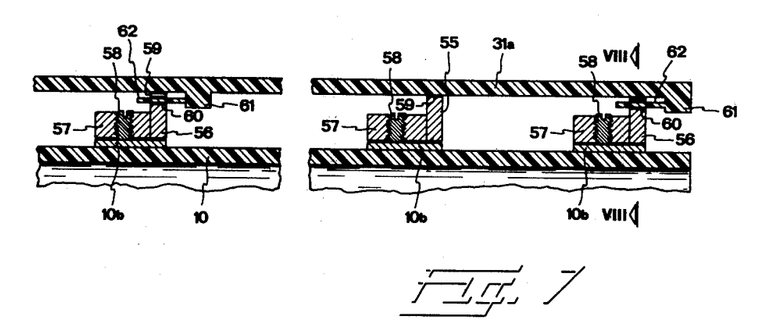
FIG. 7 is a longitudinal section, sectioned, illustrating the prolongation of the apparatus of the invention shown in FIG. 2 towards the output end, in which can be seen the arrangement of the supporting elements.

Referring now to FIGS. 7 and 8, a series of fixed sleeves 10b are provided at spaced locations along the core 10. These sleeves serve as support for a corresponding plurality of supporting elements 56 extending circumferentially outward, like a plate extending transversely with respect to the longitudinal axis of the core 10. The outer edge of the said plate is provided with a plurality of grooves 59 under each of which, in radial alignment therewith, is a circular opening 60. Said plate 56 is integral with a connecting portion 57 giving the whole a generally inverted-L configuration. In the said portion 57 are radial bores through which the fastening screws 58, preferably in the form of headless set screws, are inserted, such that the supports 56 are fixedly connected to the core 10 so as to revolve together with the latter.

The core 10 is circumferentially surrounded by a plurality of mold forming members 31 which adopt the form of elongated rods extending from a cam following relationship with the cam surface 30 to the output end of the apparatus, which is shown on the right side of FIG. 7. Said elongated rods are shaped such that they can be disposed one beside the other with a contiguity such that there is virtually no space between them, so that an outer circumferential surface can be defined, which here is referred to as a mold surface. Indeed, the purpose of this surface is to serve as a mold for forming the helical coil of the material in strip form which begins to be wound in continuation from the downstream end of the upper complementary element 40 where the operation of the apparatus of the invention begins, which will bring the helical coil continuously and controlledly towards the output end.

Each rod 31 has an end (FIGS. 9 and 10) of circular cross section, of a length sufficient to extend from the above-mentioned cam following contact with the cam surface 30 to beyond the passage 33, also of circular cross section. This section is limited by an inclined wall portion 31b which is continued to the opposite end of the rod in a substantially straight wall, slightly curved transversely, 31a, intended to constitute a longitudinal portion of the mold surface.

Figure 11:
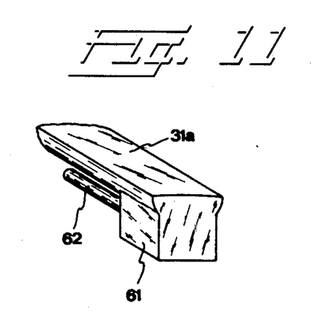
FIG. 11 is a conventional perspective view of the free end of a mold forming device, showing a guide means adapted for cooperation with a guiding element provided in a supporting device of FIG. 8.

At locations corresponding to one of the sleeves 10b, the respective portion of rod 31 has a configuration approximately like that illustrated in FIG. 11. As it can be seen, the general semicircular configuration of the section of the rod presents a lower protuberance or extension, of generally rectangular section, which defines a reinforcement base from which a guide pin 62 projects axially in the downstream direction. This pin is disposed such that it can be inserted into one of the circular openings 60 of the plate 32 corresponding to an intermediate support or to the final end support. Said pin will help to maintain the correct position of the rod, preventing any deviation thereof from its proper working relationship, and also it will facilitate the longitudinal displacement which will be discussed further on.

Figure 9:
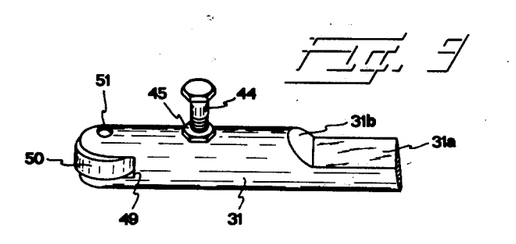
FIG. 9 is a larger-scale partial perspective view of the cam follower portion of a mold forming device employed in the invention.
Figure 10:
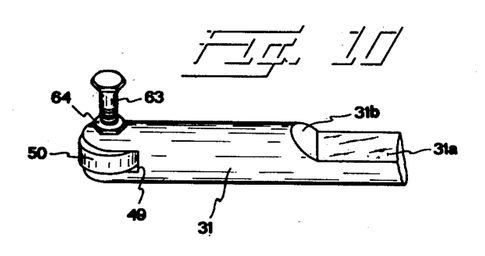
FIG. 10 is a view corresponding to FIG. 9, showing in conventional perspective a second embodiment of the cam follower portion of the mold forming device.

On the end of circular section, the rod 31 in a preferred embodiment bears a cam follower 50 (FIGS. 9 and 10). This device is placed in an end recess 49 of said rod, and preferably it is a wheel or bearing disposed with its vertical shaft 51 affixed to said rod, so as to be able to turn freely when it is in contact with the cam surface 30 and can follow the contours of said surface. In the embodiment in FIG. 9, the end portion of circular section is provided also with an anchoring element 44 in the form of a threaded bolt which is accommodated in a suitable opening perpendicularly disposed in the said rod. The bolt portion 44 is affixed by means of a lock nut 45 so as to project in a desired portion. On the other hand, in the embodiment illustrated in FIG. 10, this anchoring device 63 is disposed to serve as the shaft of the cam follower 50, its position being maintained by means of a lock nut 64.

The anchoring device (44 in FIG. 9, or 63 in FIG. 10) is thus in proper position to cooperate with a spring element 46 (FIG. 2), one of whose ends will be anchored in one of the openings 19 in the crown 17, and whose other end 48 will be anchored to said anchoring device. The said spring is adapted to force the respective rod 31 to bear constantly against the cam surface 30 by means of the cam follower 50, so that at all times the said elements will be maintained in working contact, so that each rod thus constituted and disposed will be moved in longitudinal displacement as it is turning about the longitudinal axis of the core 10, when the latter rotates, due to the spiral configuration of its cam surface 30.

Thus, for example, if the cam configuration of FIG. 5 is used, the rotation must be counterclockwise, so that, assuming that the rotation begins for a particular rod at the foot of the step 30c, at which point the rod is completely retracted, it will climb the slope defined by the cam surface 30 until, upon completion of the turn of 360°, it arrives at the tip of step 30c, at which point the rod will be in its position of maximum longitudinal displacement. As rotation continues, the cam follower, obliged by the action of the spring 46, will snap down the step 30c to return to the foot of same, from whence the cycle will resume.

On the other hand, if the cam configuration of FIG. 6 is used, the rotation must also be counterclockwise, such that, assuming that the revolution begins, for a particular rod, at the foot of step 30d, at which point the rod will be in the fully retracted position, it will climb the slope defined by the cam surface 30a until, upon completion of the first 180° of the rotation, it reaches the tip of step 30e, at which point the rod will be in the longitudinally displaced position. As the rotation continues, the cam follower 50, obliged by the action of the spring 46, will snap down from the step 30e to reach a retracted position at the foot of the latter, whence it will continue climbing the slope defined by the cam surface 30b, until, upon completion of the 360° of the revolution, it arrives at the tip of step 30d. At this point, the rod will be in a longitudinally displaced position. As the rotation continues, the cam follower device, obliged by the spring 46, will also snap over the step 30d until it reaches the bottom of same, at which point the cycle will resume.

Figure 1:
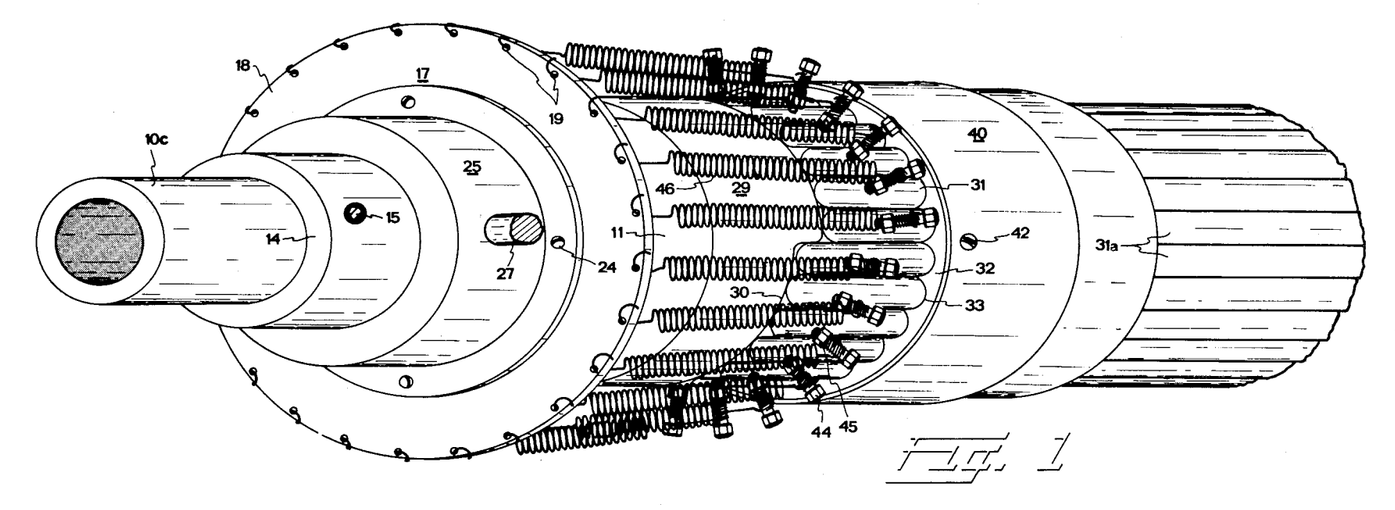
FIG. 1 is a fragmentary, conventional perspective view of the apparatus of the invention, taken from the input or initial end.

This movement of displacement and return to the retracted position is performed successively and individually by each and every one of the rods 31 disposed in the circumferential pattern which can best be understood in FIG. 1, and it is possible because, as it will be remembered from the previous explanation, the core 10 carries with it, in its rotatory movement about its longitudinal axis, the supports 36 and 56. And since the rods 31, as stated above, are inserted individually in each of the circular openings 33 of the support 36, and are accommodated slidingly and maintained in position by means of the channels 59 and the guiding orifices 60, respectively, so that they cannot alter their radial position with respect to the said core 10, the assembly of rods 31 will also perform the rotatory movement in unison with the said core 10. Inasmuch as the crown 17 is also rotatory on its bearing 20, the position of the said rods, held and urged against the cam 11, will be maintained during the rotation. Now, since the cam will remain immobile, without being drawn into the rotation on account of the fastener 27, which is held by the appropriate latch, only the rods will be displaced along the cam surface 30, such that the movement of displacement will be performed always in a uniform manner with respect to all the points circumferentially disposed around the longitudinal axis of the apparatus.

In other words, a particular rod 31, upon arriving at a particular circumferential point of the apparatus, will always maintain the same extended or retracted position, and its degree of extension or retraction will always be the same, since the change of arrangement is uniformly constant. This has an advantage, as it will be seen below when the operation of the apparatus during the production of a helical tube is discussed.

With the parts of the apparatus assembled in the manner illustrated in the drawings and described above, and after selection of the appropriate type of cam, which must be selected in accordance with the width of the continuous strip from which the helical tube is to be formed, as well as the diameter of the tube, and after the drive means (not illustrated) has been duly engaged and the feed means (not shown) have been appropriately loaded with the materials suitable for the manufacture of the helical tube, the apparatus will be ready to start forming said tube.

For this purpose, let it be assumed that the helical tube is going to be made from a strip of kraft paper disposed on spools in the continuous strip feeder, and that it is going to be glued by means of a resin capable of setting at the ambient temperature within a short time. The end of the continuous strip of paper is taken, rolling it at least one spiral at the point immediately adjacent the downstream end of the elements 40 and 43 (FIG. 2), so that, due to the tension developed by the unwound portion on the rolled spirals, the shape thus arranged can be maintained. Then the drive means is started, or its movement is transmitted by means of any appropriate clutch device, depending on the installation, so that the core 10 begins to rotate together with the supporting devices 36 and 56, and the assembly of rods 31 supported and guided by them.

The consequence of this movement will be the winding of additional portions of continuous strip. But since substantially all the rods forming the substantially cylindrical molding surface are undergoing, during the rotation, an action of displacement due to the shape of the cam 11 with which they are cooperating, the initially wound spirals will be displaced gradually and constantly towards the output end of the apparatus, in a constant portion such that the successive spirals of the paper strip will partially overlap those immediately preceding, in order thus to form a substantially tubular, continuous tube without loss of continuity.

Since there will be only one (two in the cam embodiment of FIG. 6), the rod 31 that is returning to the retracted position when it snaps down the step 30c (or the steps 30d and 30e, as the case may be), while the rest of the plurality of rods is advancing, this action will have no influence on the winding of the successive turns, but they will continue being wound at the same constant rate and pitch.

Of course, this movement of the winding of the continuous strip of paper will be accompanied by the provision of a necessary amount of resin to that the spirals formed, upon reaching the output end of the apparatus, will be able to preserve their shape and maintain their tubular form. The manner in which this resin or other glue is supplied has no significance for the idea of the present invention. The resin could be provided, for example, in the form of a bath through which the continuous strip of paper would be made to pass before its winding began; or else a resin applictor-proportioner could be provided so that, as the spirals are formed, they will be covered with the resin, or else in any appropriate manner.

Since there is virtually no space between the rods, neither the resin nor any other glue can get into the space remaining between the core 10 and the molding surface. Thus, there is no possibility that the apparatus might become clogged by the accumulation of glue and, therefore, production can continue at the normal rate, determined by the speed of rotation and the pitch of the spirals. This pitch, as mentioned briefly above, will be determined by the length of the step 30c, which in turn is selected according to the width of the continuous strip. However, if the continuous strip has a width requiring an excessively long step in order to be practical, this length can be divided into two or three or more portions, in which case each step would be a corresponding submultiple of the given length. By this expedient the need is avoided of having to use different types of rods having circular portions of a particular length and having different extensions of the guide pins 62.

It should here be pointed out that, as is not the case with the apparatus of the prior art, the combined movements can be individualized. Thus, for example, it is possible to disconnect the latch from the cam so that the cam can be driven momentarily by the rotation of the core 10, thus shutting off the advancing movement, but maintaining the rotational movement, for example, when at a particular point it is necessary to provide an outer perimetral reinforcement or enlargement of the tubular element that is being made. When the point is reached, the pawl is loosened, continuing on with the feeding of the continuous strip. Since there is no advancement, the spirals thus formed will accumulate in the same radial plane until the reinforcement is formed, the combined movement being continued when the desired thickness is reached, and for this purpose it will suffice to engage the latch to resume the advancing movement. Other applications of this individualization will be easily determined by the experts in the art.

A single strand of helical tubing will be obtained by means of the apparatus of the invention. This strand will have an indefinite length, which will increase with the length of time that it is in operation. Because even when a spool of continuous paper strip is exhausted, the end of it can be spliced with the beginning of another identical spool, so as not to interrupt the production of the tube.

Depending on the type of materials used, heating elements, of the electrical resistance type, or of any other type, can be used both externally and internally, for the purpose of accelerating the setting of the glue or of bringing it to a greater degree. Likewise, the apparatus of the invention could be disposed in functional relationship with a heating tunnel disposed at the downstream end of the said apparatus so that, when the helical tube emerges from the output end of the apparatus, it can pass through the tunnel in order to harden the glue finally and permanently. Likewise, it is contemplated that additional stations can be provided, for example, cutting and/or finishing stations at which the continuous strand of tubing can be cut to desired lengths and/or receive protective or other coatings necessary for the use that will be made of it.

It is to be understood that the embodiments here described and illustrated in the drawings have been given only by way of explanation, and that in no way must they be considered as limitations on the idea of the invention. It will be obvious that changes, alterations, modifications, and replacements by equivalent parts, can be made in what is described and illustrated above, provided that the basic and fundamental idea of the invention is not altered. It is therefore desired that all those aspects that are comprised within the broadest spirit and scope of the following claims be included among those which it is desired to protect by letters patent.

I claim:

1. An apparatus for continuously manufacturing hollow tubular elements, comprising an elongated central core having a longitudinal axis and one end portion connectable with drive means to be rotated about said longitudinal axis; a plurality of supporting elements projecting circumferentially outwardly from said central core and longitudinally spaced along the same, each supporting element being provided with a plurality of guiding means circumferentially distributed around the same and axially aligned with one another; a cam element forming a cam surface arranged circumferentially about said longitudinal axis of said core and extending in a plane which is helical with respect to a plane transverse to said axis; a plurality of rod elements forming a substantially cylindrical molding surface, said rod elements being arranged in side-by-side relationship and extending longitudinally over the entire length of said central core in a circumferentially spaced relationship with the latter, said rod elements being aligned on said supporting elements and guided in an individual cyclic displacement by said guiding means, each of said rod elements being arranged immediately following said cam element and urged against said cam surface of the latter, said cam element with said surface being supported in a non-revolving manner on said central core so that during the rotation of said central core said cam surface remains immovable, whereby when each rod element is being displaced cyclically and biased against said immovable cam surface, it will perform a movement of extension and retraction in the direction of said longitudinal axis of said core, so that a continuous strip of a tubular body forming element can be wound helically about said molding surface with constant advance of one spiral with respect to the other and with a pitch between spirals equal to the width of the continuous strip, minus a marginal overlap portion.

2. An apparatus as defined in claim 1, wherein each of said rod elements is provided with a cam follower which is individually spring-biased against said cam surface of said cam element.

3. An apparatus as defined in claim 1, wherein one of said supporting elements is provided with a plurality of substantially circular circumferentially distributed passages forming said guiding means.

4. An apparatus as defined in claim 3, wherein said one supporting element is located adjacent to said cam surface of said cam element.

5. An apparatus as defined in claim 1, wherein each of said supporting elements has an outer peripheral edge provided with a plurality of semicircular channels, and a corresponding plurality of radially aligned orifices beneath said channels, forming said guiding means.

6. An apparatus as defined in claim 5, wherein said core has an output end portion, one of said supporting elements being provided at said output end portion of said core.

7. An apparatus as defined in claim 1, wherein said cam element includes a substantially tubular body having an end portion with an inner diameter which is somewhat larger than the outer diameter of said core, said end portion of the larger diameter being arranged concentrically with respect to the remainder portion of said body in stepped manner and having an end edge defining said cam surface.

8. An apparatus as defined in claim 7, wherein said cam element is provided with a plurality of confining elements arranged to prevent longitudinal movement of said cam element relative to said core, and at least one latch element which prevents said cam element from its rotational movement.

9. An apparatus as defined in claim 1, wherein said cam surface has a single helical pitch extending over 360° of its circumference.

10. An apparatus as defined in claim 1, wherein said cam surface has a plurality of helical pitches equiangularly distributed around its circumference.

11. An apparatus as defined in claim 10, wherein said cam surface is arranged so that the sum of said helical pitches is equal to the width of the continuous strip of material for forming the tubular element, minus a marginal overlap portion.

12. An apparatus as defined in claim 2; further comprising a plurality of springs each urging a respective one of said rod elements against said cam surface, each of said rod elements having a substantially circular end section provided with said cam follower, anchoring means for a biasing spring, and a major section having a substantially semicircular section; and further comprising a plurality of dependent members arranged on said major section of said rod element so that said guiding means extend from said dependent members axially parallel to said major sections of said rod elements.

13. An apparatus as defined in claim 12, wherein said supporting elements includes a first supporting element facing toward said cam surface of said cam element and spaced from the same by a predetermined distance, said substantially circular end section of said rod elements having a length which is somewhat greater than said distance between said first supporting element and said cam surface.

14. An apparatus as defined in claim 1; and further comprising a crown element extending transversely to said longitudinal axis of said core and provided with bearing means facilitating its rotation about said axis when said core rotates, said crown element having an outer edge and being provided with a plurality of anchoring orifices adjacent to said outer edge.

15. An apparatus as defined in claim 14; and further comprising a plurality of springs each urging a respective one of said rod elements against said cam surface of said cam element, each of said springs being anchored in a respective one of said anchoring orifices of said crown element, so that the latter maintains alignment of said anchoring orifices with the arrangement of each of said rod elements.

16. An apparatus as defined in claim 2, wherein said molding surface has a circumference, said cam follower being formed by a roller having a rolling surface tangential to said circumference of said molding surface.

17. An apparatus as defined in claim 16; and further comprising a plurality of springs each urging a respective one of said rod elements against said cam surface of said cam element, said roller which forms said cam follower having an axis defined by a bolt which extends radially outwardly with respect to said molding surface so as to form anchoring means for a respective one of said springs.

* * * * *

UNITED STATES PATENT AND TRADEMARK OFFICE
CERTIFICATE OF CORRECTION

PATENT NO. : 4,289,466

DATED : September 15, 1981

INVENTOR(S) : Otto Widmer Weeper

It is certified that error appears in the above—identified patent and that said Letters Patent is hereby corrected as shown below:

On the title page, Item [76], should read --- Otto Widmer Weeper ---.

Signed and Sealed this

Sixth Day of April 1982

[SEAL]

* Attest:

GERALD J. MOSSINGHOFF

*Attesting Officer*   *Commissioner of Patents and Trademarks*